United States Patent
Bianconcini et al.

(10) Patent No.: US 12,374,119 B2
(45) Date of Patent: Jul. 29, 2025

(54) SYSTEMS AND METHODS FOR DETECTING VEHICLE TAILGATING

(71) Applicant: Verizon Connect Development Limited, Dublin (IE)

(72) Inventors: Tommaso Bianconcini, Florence (IT); Stefano Caprasecca, Florence (IT); Tommaso Mugnai, Florence (IT); Luca Bravi, Scandicci (IT); Francesco Sambo, Florence (IT); Leonardo Taccari, Florence (IT)

(73) Assignee: Verizon Connect Development Limited, Dublin (IE)

( * ) Notice: Subject to any disclaimer, the term of this patent is extended or adjusted under 35 U.S.C. 154(b) by 252 days.

(21) Appl. No.: 17/938,764

(22) Filed: Oct. 7, 2022

(65) Prior Publication Data
US 2023/0037099 A1 Feb. 2, 2023

Related U.S. Application Data

(63) Continuation of application No. 17/001,139, filed on Aug. 24, 2020, now Pat. No. 11,501,538.

(51) Int. Cl.
*G06T 7/536* (2017.01)
*G06F 18/21* (2023.01)
(Continued)

(52) U.S. Cl.
CPC .............. *G06V 20/56* (2022.01); *G06F 18/21* (2023.01); *G06T 7/20* (2013.01); *G06T 7/536* (2017.01);
(Continued)

(58) Field of Classification Search
CPC .... G06V 20/56; G06V 20/64; G06V 2201/08; G06F 18/21; G06T 7/20; G06T 7/536;
(Continued)

(56) References Cited

U.S. PATENT DOCUMENTS

| | | | | |
|---|---|---|---|---|
| 2010/0104199 A1* | 4/2010 | Zhang | .................... | G08G 1/166 |
| | | | | 382/199 |
| 2015/0049193 A1* | 2/2015 | Gupta | ....................... | G06T 7/85 |
| | | | | 348/148 |
| 2015/0332117 A1* | 11/2015 | Zhou | ......................... | G06T 5/94 |
| | | | | 382/201 |
| 2018/0060669 A1* | 3/2018 | Pham | ........................ | G06T 7/80 |

(Continued)

FOREIGN PATENT DOCUMENTS

| | | |
|---|---|---|
| CN | 107067755 | 8/2017 |
| CN | 111301407 | 6/2020 |
| JP | 2019-71057 | 5/2019 |

OTHER PUBLICATIONS

Kim et al, Efficient Vehicle Detection and Distance Estimation Based on Aggregated Channel Features and Inverse Perspective Mapping from a Single Camera, 2019, Symmetry 11(2019): 1-20. (Year: 2019).*

(Continued)

*Primary Examiner* — Kathleen M Broughton

(57) ABSTRACT

A device may obtain video data associated with a driving event involving a first vehicle. The device may determine a vanishing point associated with the video data and may construct a cone of impact of the first vehicle based on the vanishing point. The device may detect a second vehicle within the cone of impact and may analyze the subset of video frames to determine a distance between the first vehicle and the second vehicle. The device may determine a speed of the first vehicle during a time period associated with a subset of video frames. The device may determine a headway score, representative of a severity associated with the first vehicle being within a proximity threshold of the second vehicle during the time period, based on the distance and the speed. The device may determine an occurrence of a tailgating event based on the headway score.

20 Claims, 8 Drawing Sheets

(51) Int. Cl.
*G06T 7/20* (2017.01)
*G06V 20/56* (2022.01)

(52) U.S. Cl.
CPC ............ *G06T 2207/10016* (2013.01); *G06T 2207/20081* (2013.01); *G06T 2207/30236* (2013.01); *G06T 2207/30241* (2013.01); *G06T 2207/30252* (2013.01); *G06V 2201/08* (2022.01)

(58) Field of Classification Search
CPC ......... G06T 7/269; G06T 7/277; G06T 7/521; G06T 7/571; G06T 7/70; G06T 2207/10016; G06T 2207/20081; G06T 2207/30236; G06T 2207/30241; G06T 2207/30252; G06T 2207/20076; G06T 2207/20084
See application file for complete search history.

(56) References Cited

U.S. PATENT DOCUMENTS

| | | | |
|---|---|---|---|
| 2018/0257647 A1* | 9/2018 | Jurca | G01S 13/931 |
| 2019/0103026 A1* | 4/2019 | Liu | G06V 10/25 |
| 2019/0329769 A1 | 10/2019 | Shalev-Shwartz et al. | |
| 2020/0058218 A1* | 2/2020 | Julian | G08G 1/04 |
| 2020/0114815 A1 | 4/2020 | Massengill et al. | |
| 2020/0218913 A1 | 7/2020 | Unnikrishnan et al. | |

OTHER PUBLICATIONS

Jorgensen et al, Monocular 3D Object Detection and Box Fitting Trained End-to-End Using Intersection-over-Union Loss, 2019, arXiv:1906.08070v2, pp. 1-10. (Year: 2019).*

Kim, "Efficient Vanishing Point Detection for Driving Assistance Based on Visual Saliency Map and Image Segmentation from a Vehicle Black-Box Camera", Dec. 7, 2019, Symmetry, 11: 1492 (1-18). (Year: 2019).

* cited by examiner

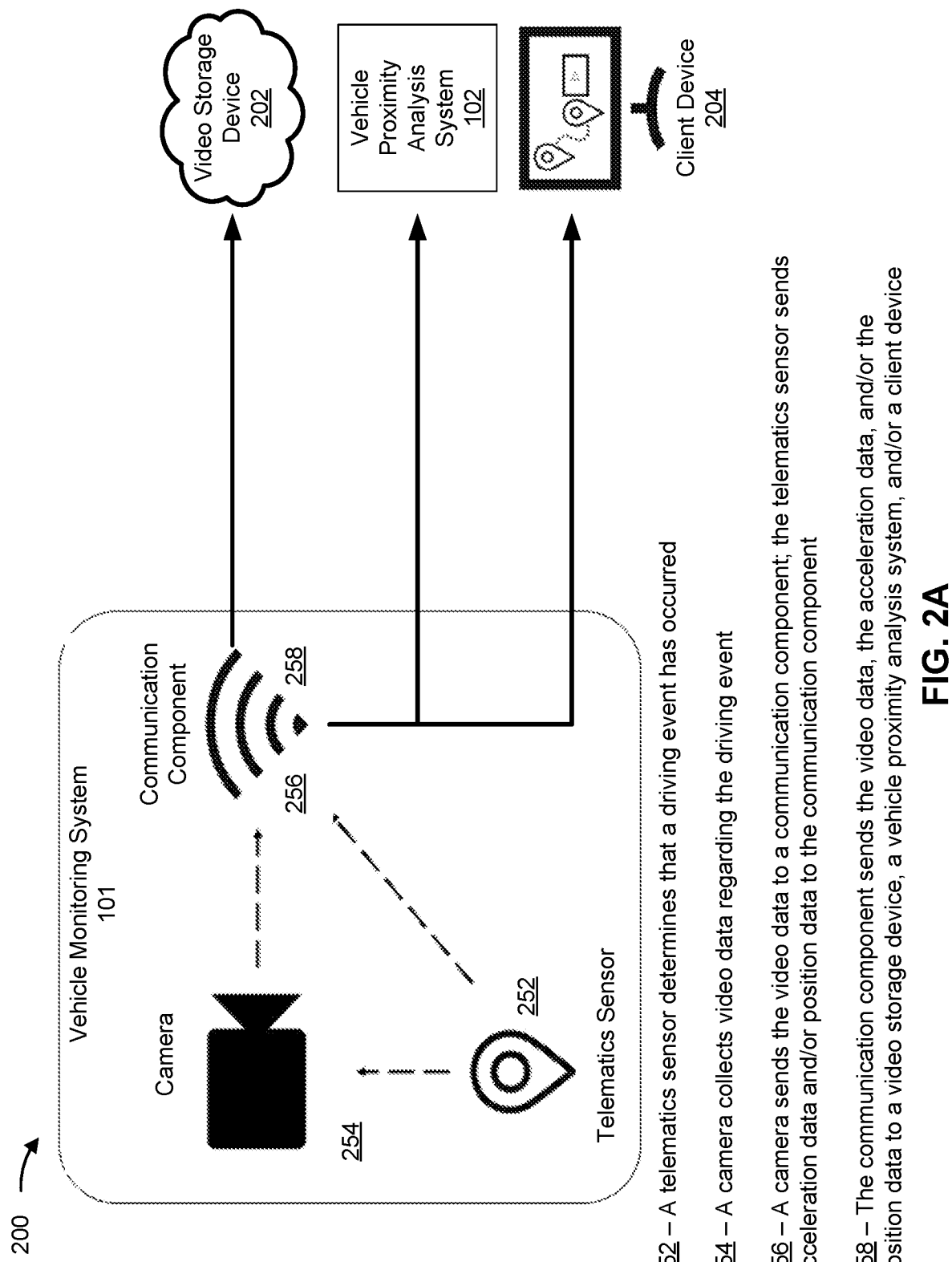

SYSTEMS AND METHODS FOR DETECTING VEHICLE TAILGATING

RELATED APPLICATION

This application is a continuation of U.S. patent application Ser. No. 17/001,139, entitled "SYSTEMS AND METHODS FOR DETECTING VEHICLE TAILGATING," filed Aug. 24, 2020, which is incorporated herein by reference in its entirety.

BACKGROUND

A dashboard camera can be mounted to a vehicle to capture video data related to the vehicle, a road the vehicle is traveling on, a path of the vehicle on the road, one or more objects on the road and/or in the path of the vehicle, and/or the like. Other sensor devices may be attached to or incorporated into the vehicle to capture data, such as a speedometer, an accelerometer, a location sensor, a steering angle sensor, and/or the like.

BRIEF DESCRIPTION OF THE DRAWINGS

FIGS. 2A-2C are diagrams of one or more example implementations described herein.

DETAILED DESCRIPTION OF PREFERRED EMBODIMENTS

Figure 1:
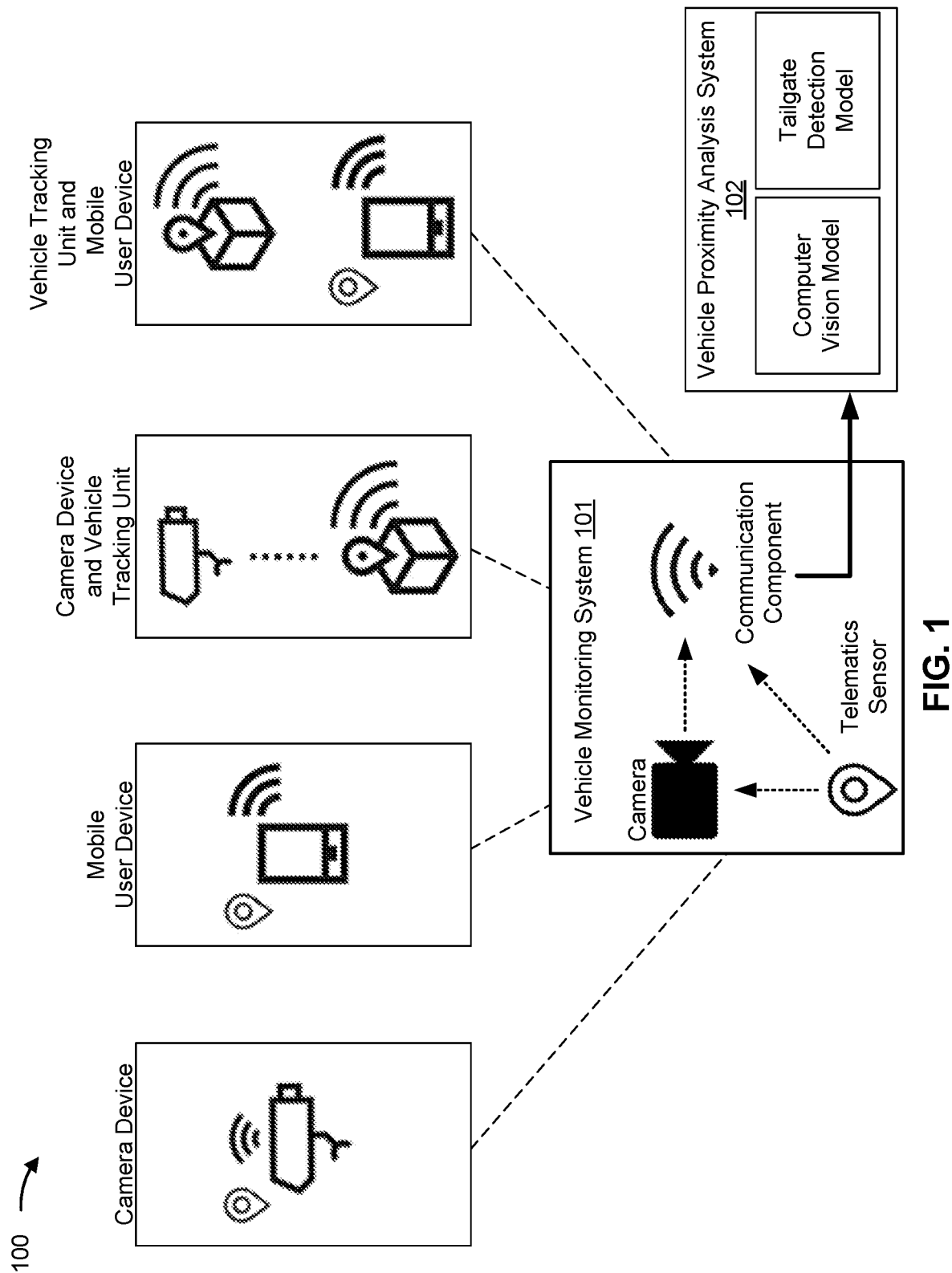
FIG. 1 is a diagram of an example implementation described herein.

The following detailed description of example implementations refers to the accompanying drawings. The same reference numbers in different drawings may identify the same or similar elements.

While driving a vehicle, a driver can experience an unsafe driving event, such as a tailgating event, a harsh braking event, a quick start event, a cornering event, a crash event, a near-crash event, an off-road event, and/or the like. For example, when a driver travels too closely to a vehicle traveling in front of the driver, the driver may experience a tailgating event.

In some circumstances, the unsafe driving event may be termed a safety-critical event and may create a dangerous situation for both drivers, both vehicles, and/or other people and property. However, the driver might not be aware that their unsafe maneuvers may lead to an unsafe driving event. Moreover, fleet managers who employ numerous drivers might not know whether the drivers exhibit unsafe maneuver behavior and/or create unsafe driving events.

Some implementations described herein may relate to a vehicle monitoring system that is capable of collecting video data and/or telematics data associated with a driving event and a vehicle proximity analysis system that is capable of identifying the driving event as an unsafe driving event (e.g., a tailgating event) based on the video data and/or the telematics data. For example, the vehicle proximity analysis system may obtain video data and telematics data associated with a driving event involving a first vehicle from a vehicle monitoring system. The vehicle proximity analysis system may construct a cone of impact associated with the first vehicle based on a set of video frames included in the video data. The vehicle proximity analysis system may detect a second vehicle within the cone of impact in the set of video frames. The vehicle proximity analysis system may analyze the set of video frames to determine a distance between the first vehicle and the second vehicle in the set of video frames. The vehicle proximity analysis system may determine a speed of the first vehicle during a time period associated with the set of video frames. The vehicle proximity analysis system may determine a headway score based on the distance and the speed. The headway score may be representative of a severity associated with the first vehicle tailgating the second vehicle during the time period. In some implementations, the headway score may represent a travel time needed given the current speed of the first vehicle to reach a current location of the second vehicle. The vehicle proximity analysis system may provide the headway score to a client device associated with the first vehicle, a driver of the first vehicle, an organization associated with the first vehicle, and/or the like.

In this way, implementations described herein can alert fleet managers and/or drivers of unsafe driving events and unsafe maneuvers associated therewith and/or provide tools for reviewing unsafe maneuvers after the unsafe driving events occur. Implementations described herein may provide drivers with information that can be used to change driving behavior (e.g., by enabling the drivers to recognize and avoid unsafe maneuvers). Similarly, implementations described herein can allow the fleet managers to create safe driving training materials and/or guidelines, which may prevent or reduce the frequency of unsafe maneuvers and of resulting unsafe driving events in the future. Preventing or reducing the frequency of unsafe maneuvers and of resulting unsafe driving events may result in the increased safety of the drivers, the vehicles that the drivers operate, and other people and property. Further, preventing or reducing the frequency of unsafe maneuvers and of resulting unsafe driving events, may also result in less wear-and-tear on the vehicles or vehicle components, which may reduce costs associated with maintaining the vehicles.

Furthermore, implementations described herein are automated and may capture and process numerous (e.g., hundreds, thousands, millions, billions, and/or the like) data points to detect numerous unsafe driving events at the same time. This can improve speed and efficiency of the process and conserve computing resources (e.g., processor resources, memory resources, communication resources, and/or the like) of the vehicle monitoring system, the vehicle proximity analysis system, and/or the client device.

Furthermore, implementations described herein use a rigorous, computerized process to perform tasks or roles that were not previously performed or were previously performed using subjective human intuition or input. Additionally, implementations described herein conserve computing resources that would otherwise be wasted in attempting to assist a human in collecting information concerning an unsafe maneuver and/or classifying the unsafe maneuver by hand.

FIG. 1 is a diagram of an example implementation 100 described herein. As shown in FIG. 1, example implementation 100 includes a vehicle monitoring system 101 that can be used by a vehicle. In some implementations, the vehicle monitoring system 101 includes a camera device, a mobile device, a vehicle tracking unit device, and/or a similar device that is capable of capturing data concerning a driving event, an unsafe maneuver, and/or the like. In some implementations, the vehicle monitoring system 101 determines that an unsafe maneuver (e.g., a harsh braking event, a quick start event, a cornering event (e.g., making a turn at an unsafe speed), a crash event, a near-crash event, an off-road event, and/or the like) has occurred and collects video data concerning the driving event based on the occurrence of the unsafe maneuver.

In some implementations, the vehicle monitoring system 101 is included in the vehicle. For example, a component of the vehicle monitoring system 101 may be mounted and/or affixed to the vehicle (e.g., on a dashboard of the vehicle, on a windshield of the vehicle, and/or the like). Alternatively, and/or additionally, the vehicle monitoring system 101 may be included in a device associated with the vehicle. For example, the vehicle monitoring system 101 may be included in a mobile device of a driver of the vehicle, a mobile device of a passenger of the vehicle, and/or the like.

In some implementations, the vehicle monitoring system 101 includes a camera (e.g., a dashboard camera, sometimes referred to as a "dash cam," a video camera, and/or the like). In some implementations, the camera is mounted and/or affixed to the vehicle such that the camera is pointed in a direction in which the vehicle is traveling. In some implementations, the camera captures video data (e.g., records the video data and stores the video data) concerning the vehicle, the trajectory of the vehicle, a road on which the vehicle is traveling, one or more objects on and/or near the road (e.g., other vehicles, sign posts, guard rails, road debris, people, animals, and/or the like), and/or the like. For example, the camera may capture a plurality of video frames, where one video frame includes information for a specific moment in time. In some implementations, the video data has a frame rate (e.g., a quantity of video frames per second). In some implementations, the vehicle monitoring system 101 includes one or more cameras that are front-facing (e.g., pointed to the front of the vehicle), rear-facing (e.g., pointed to the back of the vehicle), and/or side-facing (e.g., pointed to the side of the vehicle), and/or the like.

In some implementations, the vehicle monitoring system 101 includes a telematics sensor that obtains telematics data. For example, the vehicle monitoring system 101 may include an accelerometer that collects data concerning acceleration and/or deceleration of the vehicle (e.g., an acceleration rate, an acceleration direction, a maximum acceleration, a start time of an acceleration event, and/or the like). Additionally, or alternatively, the vehicle monitoring system 101 may include a global positioning system (GPS) sensor that collects data concerning a position of the vehicle. For example, the data concerning the position of the vehicle may include a location of the vehicle (e.g., represented as a latitude and longitude pair), a time of the location of the vehicle (e.g., when the vehicle is at the location), a direction of the vehicle (e.g., which way the vehicle is pointing, such as in degrees away from north, where north is represented by zero degrees), a distance from a last recorded location of the vehicle, and/or the like.

In some implementations, the vehicle monitoring system 101 includes a communication component. For example, the vehicle monitoring system 101 may include a wireless communication device to facilitate communication between the vehicle monitoring system 101 and one or more other devices. The communication component may transmit the video data, telematics data (e.g., data concerning an acceleration/deceleration of the vehicle, data concerning a position of the vehicle, and/or the like), and/or the like to the one or more other devices.

As an example, as shown in FIG. 1, the vehicle may use a camera device, such as a smart dashboard camera, as the vehicle monitoring system 101 (where the camera device includes the camera), the telematics sensor (which includes the accelerometer and the GPS sensor), and the communication component. As another example, the vehicle may use a mobile user device (such as a cellular phone) as the vehicle monitoring system 101 (where the mobile user device includes the camera), the telematics sensor (which includes the accelerometer and the GPS sensor), and the communication component.

In a further example, as shown in FIG. 1, the vehicle monitoring system 101 of the vehicle may comprise a camera device (such as a basic dashboard camera) and a vehicle tracking unit device. The camera device may include the camera. The vehicle tracking unit device may include the telematics sensor (which includes the accelerometer and the GPS sensor) and the communication component. In some implementations, the vehicle tracking unit device is an internal component of the vehicle. In some implementations, the camera device and the vehicle tracking unit device communicate with each other to share information (e.g., by a wireless and/or wired connection).

In an additional example, the vehicle monitoring system 101 of the vehicle may comprise a vehicle tracking unit device and a mobile user device. In some implementations, the vehicle tracking unit device includes the GPS sensor and a first communication component, and the mobile user device includes the camera, the accelerometer, and a second communication component. In some implementations, the vehicle tracking unit device does not directly communicate with the mobile user device. In these implementations, the vehicle tracking unit device and the mobile user device may transmit, respectively, data to the one or more other devices via the first communication component of the vehicle tracking unit device and the second communication component of the mobile user device.

As further shown in FIG. 1, the communication component of the vehicle monitoring system 101 may communicate with a vehicle proximity analysis system 102. For example, the vehicle monitoring system 101 may provide stored or real-time data regarding operation of a vehicle for processing by the vehicle proximity analysis system 102. In some implementations, the vehicle proximity analysis system 102 includes a computer vision model, a tailgate detection model, and/or the like. For example, as described in more detail herein, the vehicle proximity analysis system 102 may perform path analysis, object detection, and/or the like on video data captured by a camera of the vehicle monitoring system 101 by, in some implementations using the computer vision model. The computer vision model may include an object detection model that analyzes a video frame of the video data to detect a vehicle depicted in the video frame. The object detection model may output a bounding box that includes a vehicle depicted in the video frame and a category (e.g., a car, a bus, a truck, and/or the like) of the detected video as a result. Additionally, or alternatively, the vehicle proximity analysis system 102 may use other techniques to analyze data captured by one or more sensors of the vehicle monitoring system 101.

Based at least in part on telematics data, results of processing using the computer vision model, and/or the like, the vehicle proximity analysis system 102 may use a tailgate detection model to determine whether a driving event is to be classified as a tailgating event (e.g., a vehicle traveling within a proximity threshold of another vehicle for a period of time), as described herein. Using machine learning models to analyze video data and telematics data may enable driving event classification with a reduced set of sensors and/or with reduced cost (e.g., lower-fidelity, inexpensive) sensors relative to other techniques that use extensive sensor data to determine driving parameters of a vehicle and classify driving events associated therewith.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2B:
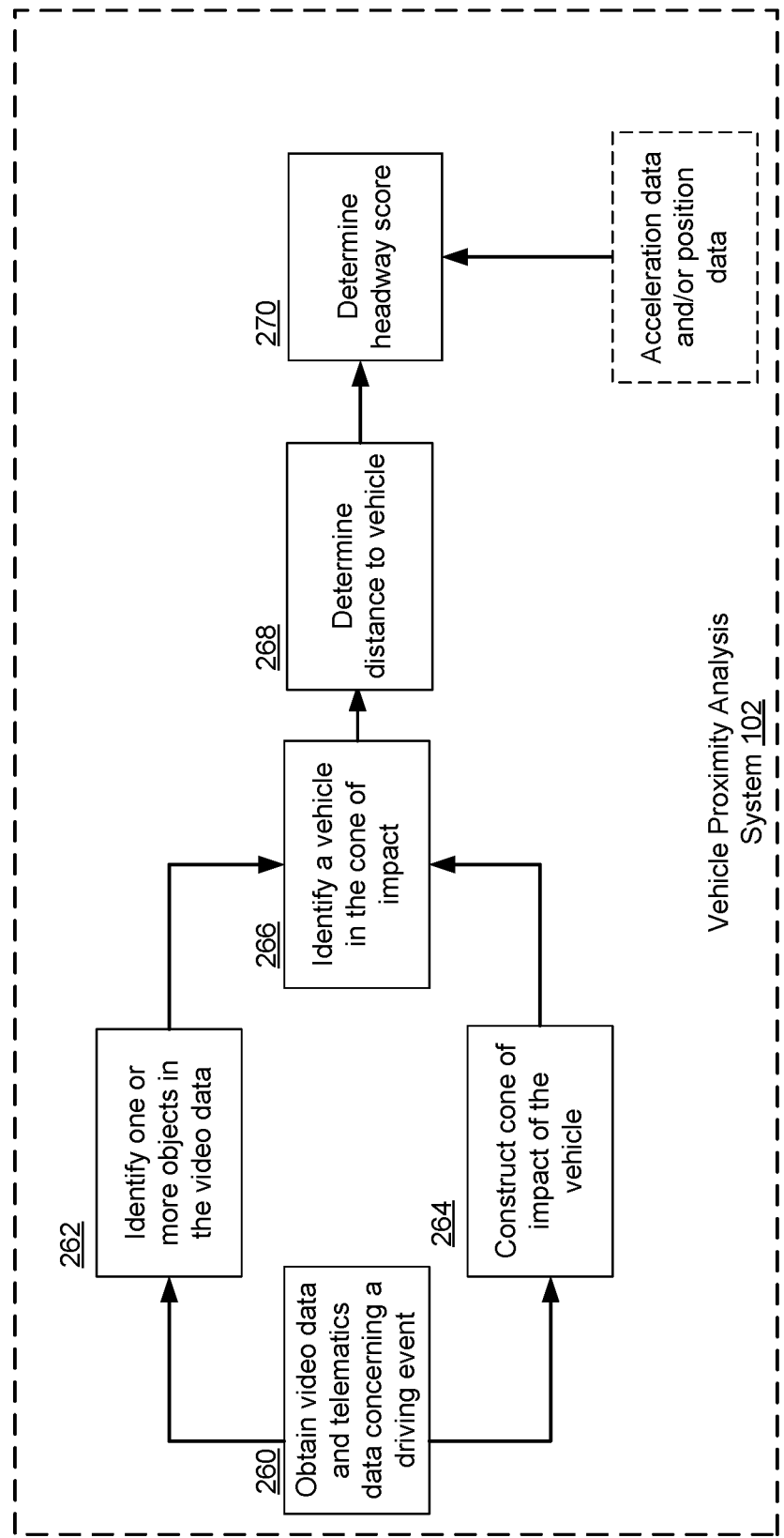
Figure 2C:
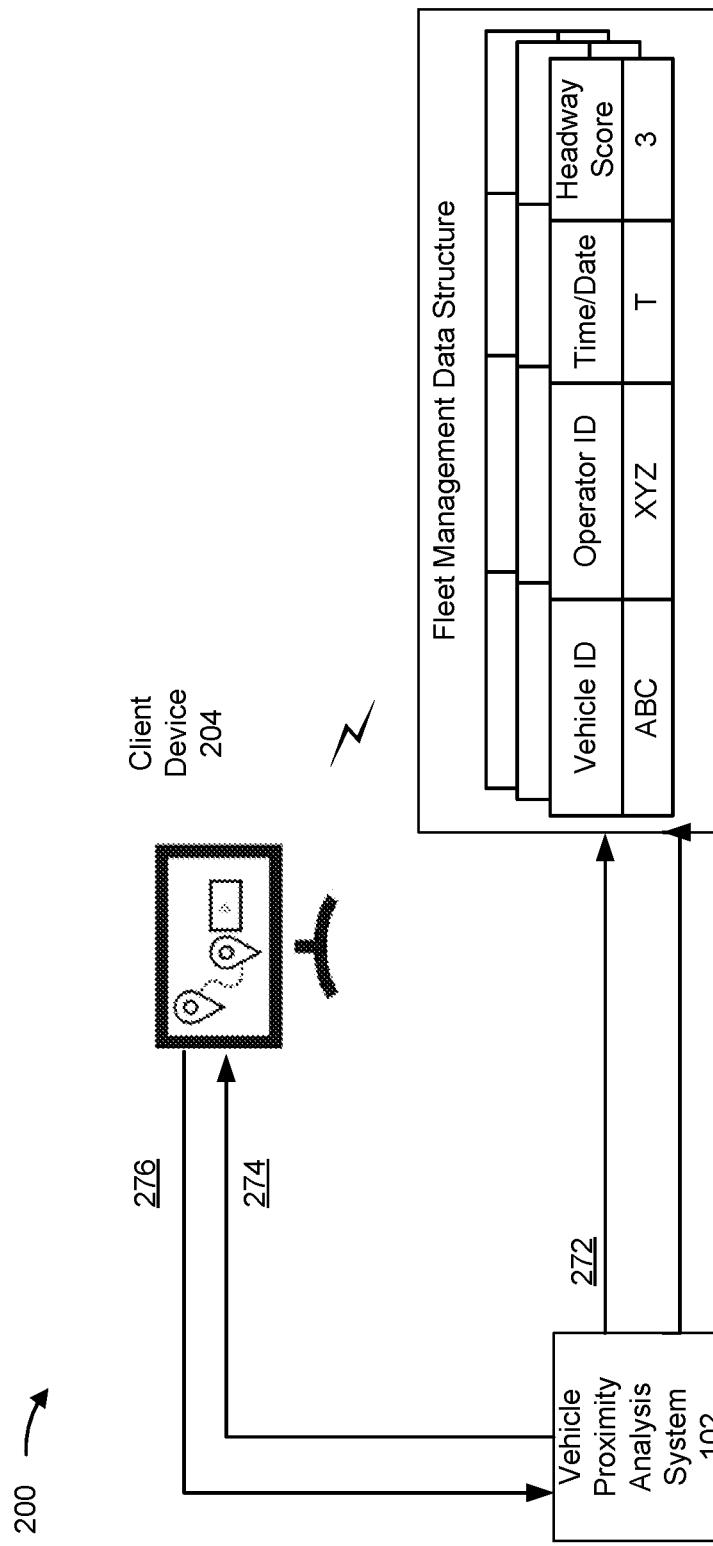

FIGS. 2A-2C are diagrams of one or more example implementations 200 described herein. As shown in FIGS. 2A-2C, example 200 includes a vehicle monitoring system 101, a vehicle proximity analysis system 102, a video storage device 202, and a client device 204.

As shown in FIG. 2A, and by reference number 252, a telematics sensor determines that a driving event has occurred. The driving event may include any type of action related to the operation of the vehicle. For example, the driving event may include starting the vehicle, shifting the vehicle into a drive gear, the vehicle traveling along a roadway, braking, turning, accelerating, changing lanes, activating a turn signal, and/or the like.

In some implementations, the telematics sensor determines that a harsh driving event has occurred. For example, the telematics sensor can process data concerning the acceleration/deceleration of the vehicle (e.g., a rapid increase in the acceleration of the vehicle, a rapid decrease in the acceleration of the vehicle, the acceleration of the vehicle satisfies a threshold, the acceleration direction of the vehicle suddenly changes, and/or the like) to determine that the harsh driving event has occurred. For example, the vehicle monitoring system 101 may determine that a speed of the vehicle decreases by more than a threshold amount during an amount of time, that the speed of the vehicle increases by more than a threshold amount during an amount of time, and/or the like.

Additionally, or alternatively, the telematics sensor can detect, via an accelerometer, a sudden decrease in an acceleration of the vehicle (e.g., the acceleration of the vehicle decreases by more than a threshold amount during an amount of time) and determine that a harsh driving event (e.g., a hard braking event) has occurred. In this case, based at least in part on a determination that a harsh driving event has occurred, vehicle monitoring system 101 may trigger a determination of whether a tailgating event preceded the harsh driving event.

Additionally, or alternatively, vehicle proximity analysis system 102 and/or vehicle monitoring system 101 may determine that a driving event has occurred and may be triggered to detect whether a tailgating event has occurred based on the occurrence of the driving event and/or based on another type of trigger. For example, vehicle monitoring system 101 may receive other sensor data, such as data from a collision sensor, an audio sensor, an output of a machine learning model processing video data from a camera, one or more sensors of, for example, a mobile device (e.g., an accelerometer, a location sensor, an audio sensor, a gyroscope, etc.), and/or the like and may detect a driving event based on the other sensor data. Additionally, or alternatively, vehicle monitoring system 101 may detect a user interaction with a button, a user interaction with a user interface, a voice command, and/or the like, which vehicle monitoring system 101 may interpret as a trigger for detecting whether a tailgating event has occurred.

As shown by reference number 254, a camera of the vehicle monitoring system 101 collects video data regarding the driving event. For example, the camera, may continuously capture video data (e.g., record the video data and cache the video data). The camera may receive an indication of the driving event from the telematics sensor and may store cached video data for further analysis. In some implementations, the indication may include information identifying a start time of the driving event, an end time of the driving event, and/or the like. The camera may store video data that was captured during the driving event, for a threshold amount of time before the driving event (e.g., to capture a potential unsafe maneuver leading to a harsh driving event), for a threshold amount of time after the driving event (e.g., to capture a result of a harsh driving event, such as a collision or near-collision), and/or the like. In this way, the camera may collect the video data for a period of time that shows what happened prior to the driving event and after the driving event.

As shown by reference number 256, a camera sends the video data to a communication component and the telematics sensor sends acceleration data and/or position data to the communication component. For example, the camera may send video data regarding the driving event to the communication component for transmission. The telematics sensor may send telematics data, such as the data concerning acceleration/deceleration of the vehicle, the data concerning the position of the vehicle, and/or the like, to the communication component. As shown by reference number 258, the communication component sends the video data, the acceleration data, and/or the position data to the video storage device 202, the vehicle proximity analysis system 102, and/or the client device 204.

As shown in FIG. 2B, and by reference number 260, the vehicle proximity analysis system 102 obtains video data and telematics data concerning the driving event. For example, the telematics sensor may determine that a driving event has occurred in a manner similar to that described above with respect to FIG. 2A. The vehicle proximity analysis system 102 may obtain the video data and/or the telematics data from the vehicle monitoring system 101 and/or the video storage device 202 based on determining that the driving event has occurred.

In some implementations, the video data and/or the telematic data are obtained based on the vehicle monitoring system 101 detecting an occurrence of a harsh driving event. The vehicle monitoring system 101 may detect the occurrence of the harsh driving event based on the video data, the telematic data, a user input provided via a user interface associated with the vehicle monitoring system 101, sensor data obtained from another device, and/or the like. The vehicle monitoring system 101 may provide the video data and the telematic data to the vehicle proximity analysis system 102 based on detecting the occurrence of the harsh driving event. Additionally, and/or alternatively, the vehicle proximity analysis system 102 may obtain the video data periodically (e.g., every hour, every day, every week, and/or the like), based on providing a request to the vehicle monitoring system 101, and/or the like.

In some implementations, the vehicle proximity analysis system 102 obtains the video data and/or the telematics data based on a message received from the vehicle monitoring system 101. In some implementations, the message includes a link (e.g., a uniform resource link (URL)) to the video data stored at the video storage device 202. In some implementations, the vehicle proximity analysis system 102 may download the video data via the link from the video storage device 202. In some implementations, the message includes the data concerning acceleration/deceleration of the vehicle and/or the data concerning the position of the vehicle. In some implementations, the vehicle proximity analysis system 102 identifies the vehicle and the driving event based on the data concerning acceleration/deceleration of the vehicle and/or the data concerning the position of the vehicle.

In some implementations, the vehicle proximity analysis system 102 obtains the video data from the vehicle monitoring system 101 and/or the video storage device 202 without having to download the video data via a link from the video storage device 202. For example, vehicle monitoring system 101 and/or the video storage device 202 may send the video data to the vehicle proximity analysis system 102 (e.g., push the video data to the vehicle proximity analysis system 102) without the vehicle proximity analysis system 102 having to request the video data.

As shown by reference number 262, the vehicle proximity analysis system 102 identifies one or more objects in the video data. The vehicle proximity analysis system 102 may process each video frame, of the plurality of video frames, to identify respective objects depicted in the plurality of video frames. In some implementations, the vehicle proximity analysis system 102 uses an object detection algorithm to identify a vehicle (referred to herein as the second vehicle) in a video frame. For example, the vehicle proximity analysis system 102 may process the video frame using a convolutional neural network to determine the second vehicle, a bounding box that includes the second vehicle, and/or a category of the second vehicle (e.g., a car, a truck, a motorcycle, and/or the like).

In some implementations, the vehicle proximity analysis system 102 utilizes a machine learning model (e.g., the computer vision model) to identify the one or more objects in the video data. The computer vision model may be trained based on data relating to video frames depicting vehicles and data relating to a location of the vehicles in the video frames and a type or classification associated with the vehicles. The computer vision model may be trained to identify one or more vehicles in the video frames and a confidence score that reflects a measure of confidence that the vehicle is depicted in the video frame. In some implementations, the vehicle proximity analysis system 102 trains the computer vision model in a manner similar to that described below with respect to FIG. 3.

As shown by reference number 264, the vehicle proximity analysis system 102 constructs a cone of impact of the vehicle. The cone of impact may be an ideal extension of a lane of a road in which the vehicle is traveling. The cone of impact may include all points of the road lying along a path of the vehicle that will be presumably encountered by the vehicle along the vehicle's trajectory. Stated differently, the cone of impact may be the area of the video frame that represents a path along which the vehicle will travel given the vehicle's trajectory in the video frame.

In some implementations, the vehicle proximity analysis system 102 may construct the cone of impact of the vehicle for the video frame based on determining a vanishing point associated with the video data. In some implementations, the vehicle proximity analysis system 102 uses an object tracking algorithm to determine the vanishing point associated with the video data. The object tracking algorithm may utilize the bounding boxes determined by the object detection algorithm to determine a trajectory of the vehicles included in the bounding boxes.

The vehicle proximity analysis system 102 may determine the four corners of a bounding box that includes a vehicle depicted in the video frame. The vehicle proximity analysis system 102 may compute a trajectory associated with each corner of the bounding box. The vehicle proximity analysis system 102 may determine an intersection point of the trajectories determined for the corners of the bounding box. The vehicle proximity analysis system 102 may determine a candidate vanishing point for the vehicle in the bounding box corresponding to the intersection point of the trajectories of the corners of the bounding box.

In some implementations, the vehicle proximity analysis system 102 determines a confidence score associated with the candidate vanishing point. The confidence score may be determined based on the intersection of the trajectories of the corners of the bounding box. The vehicle proximity analysis system 102 may associate the candidate vanishing point with a first confidence score when the trajectories of the corners of the bounding box intersect at single point. The vehicle proximity analysis system 102 may determine a second, lower confidence score when the trajectories intersects at multiple points.

The vehicle proximity analysis system 102 may determine a candidate vanishing point and/or a confidence score for each of a plurality of vehicles depicted in the video data in a manner similar to that described above. The vehicle proximity analysis system 102 may determine a vanishing point associated with the video data based on the candidate vanishing points and/or confidence scores. For example, the vehicle proximity analysis system 102 may weight each candidate vanishing point based on the confidence score associated with the candidate vanishing point. The vehicle proximity analysis system 102 may determine the vanishing point for the video data based on the weighted vanishing points.

The cone of impact may be a triangular area of the video frame having the vanishing point as a vertex and a portion of a bottom of the video frame as a side. The bottom of the video frame may be an edge of the video frame having side vertices positioned symmetrically left and right with respect to the x-coordinate of the vanishing point. Additionally, and/or alternatively, the bottom of the video frame may be selected based on a horizontal inclination of the video frame and/or the height at which the camera is mounted.

In some implementations, a length of the portion of the bottom of the video frame may be a fixed length (e.g., one-half a length of the bottom of the video frame, one-third a length of the bottom of the video frame, and/or the like). In some implementations, the length of the portion of the bottom of the video frame may be determined based on one or more variables such as, a height at which the camera is mounted on the vehicle, a size of the second vehicle in the video frame, based on a width of a lane of a road, and/or the like.

In some implementations, the vehicle proximity analysis system 102 determines the vanishing point based on computing an optical flow associated with the video data. In some implementations, the vehicle proximity analysis system 102 uses an optical flow algorithm to compute the optical flow associated with the video data. For example, the vehicle proximity analysis system 102 may process the video frame using Farneback's algorithm to compute the optical flow of the video frame. The optical flow may be the apparent direction of each pixel from one video frame to a next video frame. The optical flow algorithm may combine all the directions to estimate the point towards with the vehicle motion is directed. The vehicle proximity analysis system 102 may determine the vanishing point based on the point towards with the vehicle motion is directed.

In some implementations, the vehicle proximity analysis system 102 uses a vanishing point algorithm to determine the vanishing point of the video frame. For example, the vehicle proximity analysis system 102 may process the video frame using a random sample consensus (RANSAC) algorithm to determine the vanishing point of the video frame.

As shown by reference number 266, the vehicle proximity analysis system 102 identifies a second vehicle in the cone of impact. In some implementations, the vehicle proximity analysis system 102 determines that a second vehicle is within the cone of impact based the bounding box of the second vehicle. The vehicle proximity analysis system 102 may identify a lowest edge of the bounding box relative to the other edges of the bounding box. The vehicle proximity analysis system 102 may determine a center point of the lowest edge of the bounding box. The vehicle proximity analysis system 102 may determine whether the center point is within the cone of impact. The vehicle proximity analysis system 102 may determine that the second vehicle in the bounding box is in the cone of impact when the center point is within the cone of impact. The vehicle proximity analysis system 102 may determine that the second vehicle is not within the cone of impact when the center point is not within the cone of impact.

In some implementations, the video frame may depict multiple second vehicles within the cone of impact. The vehicle proximity analysis system 102 may determine that the second vehicle in the bounding box having the lowest bottom edge is directly in front of the vehicle for which the driving event was detected. The vehicle proximity analysis system 102 may process each video frame, of the plurality of video frames included in the video data, in a manner similar to that described above.

In some implementations, the vehicle proximity analysis system 102 utilizes a machine learning model (e.g., the tailgate detection model) to detect the second vehicle within the cone of impact in the subset of video frames. In some implementations, the vehicle proximity analysis system 102 trains the tailgate detection model to detect a second vehicle within a cone of impact in a subset of video frames. The tailgate detection model may be trained based on data relating to video frames depicting vehicles and data relating to whether the second vehicles are within a cone of impact. For example, the tailgate detection model may be trained by processing the video data and utilizing a result of the analysis performed to detect the second vehicle within the cone of impact described above as ground truth. The tailgate detection model may be trained to detect a second vehicle within a cone of impact and a confidence score that reflects a measure of confidence that the vehicle is within the cone of impact. In some implementations, the vehicle proximity analysis system 102 trains the tailgate detection model in a manner similar to that described below with respect to FIG. 3.

As shown by reference number 268, the vehicle proximity analysis system 102 determines a distance to the vehicle in the cone of impact. below with respect to FIG. 3.

In some implementations, the vehicle proximity analysis system 102 determines the distance to the second vehicle in the cone of impact geometrically. The vehicle proximity analysis system 102 may determine a set of parameters associated with the camera. For example, the vehicle proximity analysis system 102 may determine a focal length of the camera, a level of a horizon within the video frame, a height of the camera with respect to the ground, and/or the like. The vehicle proximity analysis system 102 may determine the set of parameters based accessing a data structure storing the set of parameters, based on a user inputting the set of parameters via a user interface associated with the vehicle proximity analysis system 102, and/or the like.

In some implementations, the vehicle proximity analysis system 102 may calculate one or more of the set of parameters based on a size of the vehicle. The vehicle proximity analysis system 102 may determine a location at which the camera is mounted on the vehicle, such as a dashboard, a fender, and/or the like. The vehicle proximity analysis system 102 may determine a type of the vehicle based on the output of the object detection algorithm. The vehicle proximity analysis system 102 may determine a size of the vehicle (e.g., a height of the fender, a position of the windshield, and/or the like) based on the type of the vehicle. For example, the vehicle proximity analysis system 102 may determine the size of the vehicle based on accessing a data structure storing information associated with the sizes of various types of vehicles. The vehicle proximity analysis system 102 may determine a height of the camera with respect to the ground based on the position of the camera on the vehicle and the size of the vehicle (e.g., a height of the fender when the camera is mounted on a fender of the vehicle, a height of a bottom of the windshield when the camera is mounted on a dashboard of the vehicle, and/or the like).

In some implementations, the vehicle proximity analysis system 102 may rectify the video frame. The vehicle proximity analysis system 102 may rectify the video frame by rotating the video frame around a horizontal axis until a horizon level of the video frame is brought exactly at half of a height of the video frame. The vehicle proximity analysis system 102 may determine the distance to the second vehicle by dividing a product of the focal length and the camera height by a distance from horizon in the rectified video frame plane.

In some implementations, the vehicle proximity analysis system 102 utilizes a machine learning model (e.g., a depth analysis model) to determine the distance between the vehicle and the second vehicle. The depth analysis model may include a deep learning model, a regression model, and/or the like.

In some implementations, the vehicle proximity analysis system 102 trains the depth analysis model to determine the distance between a first vehicle and a second vehicle in a set of frames. The depth analysis model may be trained based on a set of training data that includes video frames depicting vehicles and data relating to a distance between the depicted vehicles in the video frames. The depicted vehicles may be a same type of vehicle and/or a different type of vehicle as the vehicle. The depth analysis model may be trained to determine a distance between vehicles depicted in a video frame and a confidence score that reflects a measure of confidence that the distance is accurate. In some implementations, the vehicle proximity analysis system 102 trains the depth analysis model in a manner similar to that described In some implementations, the vehicle proximity analysis system 102 utilizes a pinhole camera model to determine the distance to the second vehicle in the cone of impact. The pinhole camera model may be a computer vision model for describing the mathematical relationship between the coordinates of a point in three-dimensional space and the projection of the point onto the image plane of a camera (e.g., the video frame). The vehicle proximity analysis system 102 may provide the set of parameters and the video frame to the pinhole camera model as an input and the pinhole camera model may output information indicating the distance to the second vehicle as a result.

In some implementations, the vehicle proximity analysis system 102 utilizes a regression model to determine the distance to the second vehicle in the cone of impact. The regression model may determine the distance to the second vehicle based on a size of the bounding box surrounding the second vehicle in the video frame. The regression model may determine the distance to the second vehicle based on the equation:

$$Z = i + s * x^{-1},$$

where Z is the distance, x is one of a width or a height of the bounding box. The parameter x may be the height of the bounding box when an accuracy associated with determining the height of the bounding box is greater than an accuracy associated with determining the width of the bounding box. The parameter x may be the width of the bounding box when the accuracy associated with determining the width of the bounding box is greater than the accuracy associated with determining the height of the bounding box. The parameters i and s may be learned by the regression model by training the regression model. For example, the regression model may be trained to determine the distance of the second vehicle in the cone of impact in a manner similar to that described below with respect to FIG. 3.

Additionally, and/or alternatively, the vehicle proximity analysis system 102 may determine the distance between the vehicle and the second vehicle based on the telematic data. For example, the vehicle monitoring system 101 may include a radar, a LIDAR, and/or the like for obtaining object distance data indicating a distance between the vehicle and an object (e.g., the second vehicle) located within a particular distance of the vehicle. The vehicle proximity analysis system 102 may determine the distance based on the object distance data included in the telematic data.

As shown by reference number 270, the vehicle proximity analysis system 102 determines a headway score based on the distance to the second vehicle and telematics data associated with the vehicle. The headway score may be representative of a severity associated with the vehicle being within a proximity threshold of the second vehicle during the time period (e.g., a severity associated with the vehicle tailgating the second vehicle during the time period).

In some implementations, the headway score may represent an amount of time required for the vehicle to reach a location of the second vehicle based on the current speed of the vehicle. The vehicle proximity analysis system 102 may determine a first headway score based on the amount of time required for the vehicle to reach the location of the second vehicle satisfying a first time threshold (e.g., 1.0 seconds, 2.0 seconds, and/or the like) and/or a first distance threshold (e.g., 1.0 meters, 2.0 meters, and/or the like). The vehicle proximity analysis system 102 may determine a second headway score based on the amount of time required for the vehicle to reach the location of the second vehicle satisfying a second threshold (e.g., 7.0 seconds, 10.0 seconds, and/or the like) and/or a second distance threshold (e.g., 10.0 meters, 11.0 meters, and/or the like). The first headway score may indicate a greater severity relative to the second headway score.

The vehicle proximity analysis system 102 may determine the headway score based on the distance to the vehicle and a speed of the vehicle. The vehicle proximity analysis system 102 may determine the speed of the vehicle based on the telematics data. For example, the telematics data may include information indicating the speed of the vehicle and information indicating a time at which the vehicle was traveling at the indicated speed.

The vehicle proximity analysis system 102 may determine a time associated with the video frame. For example, the video data may include information indicating a time at which the video frame was captured (e.g., a time stamp), a video frame rate associated with the video data, and/or the like. The vehicle proximity analysis system 102 may determine the time associated with the video frame based on the information included in the video data. The vehicle proximity analysis system 102 may determine a speed of the vehicle associated with the video frame based on the information indicating the time at which the vehicle was traveling at the indicated speed and the time associated with the video frame.

The vehicle proximity analysis system 102 may determine a headway score associated with the vehicle based on dividing the distance to the second vehicle by the speed of the vehicle at the time associated with the video frame. In some implementations, the vehicle proximity analysis system 102 determines a respective headway score for each video frame of the plurality of video frames.

In some implementations, the vehicle proximity analysis system 102 determines a respective headway score for a set of video frames associated with a period of time (e.g., five seconds, ten seconds, thirty seconds, one minute, and/or the like). In some implementations, the vehicle proximity analysis system 102 determines the duration of the tailgating event based on a set of video frames associated with a period of time prior to the time associated with the video frame and/or a set of video frames associated with a period of time after the time associated with the video frame.

In some implementations, the vehicle proximity analysis system 102 determines the period of time based on a time at which a harsh driving event occurred. For example, the vehicle proximity analysis system 102 may determine the period of time based on a period of time prior to the occurrence of the harsh driving event, a period of time after the occurrence of a harsh driving event, and/or the like. In this way, the vehicle proximity analysis system 102 may determine whether the harsh driving event resulted from a tailgating event.

The vehicle proximity analysis system 102 may identify a video frame, of the plurality of video frames, associated with a tailgating event based on the headway determined for the video frame satisfying a threshold headway. The vehicle proximity analysis system 102 may determine a severity of the tailgating event based on a duration of the headway event. The vehicle proximity analysis system 102 may determine the duration of the tailgating event based on a series of video frames preceding the video frame associated with a headway that satisfies the threshold headway and/or a series of video frames following the video frame associated with a headway that satisfies the threshold headway.

For example, the vehicle proximity analysis system 102 may determine that a headway for a first video frame immediately preceding the video frame satisfies the threshold headway (e.g., 3.0 seconds, 5.0 seconds, 2.0 meters, and/or the like), that a headway for a second video frame immediately preceding the first video frame does not satisfy the threshold headway, and that a headway for a third video frame immediately following the video frame does not satisfy the threshold headway. The vehicle proximity analysis system 102 may determine the duration of the tailgating event based on a series of video frames that includes the first video frame and the video frame. For example, the vehicle proximity analysis system 102 may determine a first time associated with the first video frame and a second time associated with the video frame. The vehicle proximity analysis system 102 may determine the duration of the tailgating event based on the first time and the second time (e.g., subtracting the first time from the second time).

The vehicle proximity analysis system 102 may determine the headway score for the video frame based on the headway and the duration of the tailgating event. The vehicle proximity analysis system 102 may determine that the headway score comprises a first headway score (e.g., a headway score indicating a severe tailgating event) based on the headway satisfying a first headway severity threshold and/or the duration satisfying a first time threshold. The vehicle proximity analysis system 102 may determine that the headway score comprises a second headway score (e.g., a headway score indicating a mild or less severe tailgating event) based on the headway satisfying a second headway severity threshold and/or the duration satisfying a second time threshold. In some implementations, the second time threshold may be the same as the first time threshold. The vehicle proximity analysis system 102 may determine that the headway score comprises a third headway score (e.g., a headway score indicating that a tailgating event did not occur) based on the headway failing to satisfying the first headway severity threshold and the second headway severity threshold and/or the duration failing to satisfy the first time threshold and the second time threshold.

In some implementations, the vehicle proximity analysis system 102 determines a respective headway score for each video frame, included in the series of video frames and/or for each video frame of the plurality of video frames, in a manner similar to that described above.

As shown in FIG. 2C, and by reference number 272, the vehicle proximity analysis system 102 stores an entry in a data structure that identifies the headway score and the vehicle identifier associated with the vehicle. Based on determining the headway, the duration of the tailgating event, the headway score, and/or the like, the vehicle proximity analysis system 102 may associate the headway, the duration of the tailgating event, the headway score, and/or the like with the vehicle, an operator of the vehicle, a location of the vehicle, a time at which the tailgating event occurred, and/or the like. The vehicle proximity analysis system 102 may store the entry in the data structure based on associating the headway, the duration of the tailgating event, the headway score, and/or the like with the vehicle, the operator of the vehicle, the location of the vehicle, the time at which the tailgating event occurred, and/or the like. As shown in FIG. 2C, the entry includes the vehicle identifier, an operator identifier associated with the operator of the vehicle, a time and/or date at which the tailgating event occurred, and the headway score.

As shown by reference number 274, the vehicle proximity analysis system 102 provides a notification associated with the entry being added to the data structure and/or provides the headway score and the vehicle identifier to the client device 204. The vehicle proximity analysis system 102 may send the notification to the client device 204 to permit the client device 204 to display information identifying the tailgating event, a portion of the video data associated with the tailgating event (e.g., the series of frames), the cone of impact, a portion of the telematics data associated with the tailgating event, and/or the like at the client device 204.

In some implementations, the vehicle proximity analysis system 102 may provide information to permit client device 204 to display, via a user interface of the display, an icon on a map that indicates a tailgating event, the headway score determined for the tailgating event, and/or a location of the vehicle associated with the tailgating event. In some implementations, the user interface can display a menu that includes information regarding trips made by the vehicle. In some implementations, a user of client device 204 can select a trip and the user interface can display a map that shows the route associated with the trip and one or more icons that indicate one or more tailgating events. In some implementations, for an icon of the one or more icons, a color of the icon can indicate a severity of the tailgating event (e.g., a red icon indicates a severe tailgating event, a yellow icon indicates a mild tailgating event, and/or the like).

In some implementations, the vehicle proximity analysis system 102 may provide a notification of the tailgating event to a client device 204 used by a fleet manager. In some implementations, the notification may include an automatically generated video clip of the tailgating event. For example, vehicle proximity analysis system 102 may select frames of video data relating to the tailgating event that precede the driving event (e.g., a harsh driving event), and may generate a video file of the selected frames. In some implementations, vehicle proximity analysis system 102 may generate an overlay of contextual data for the video file. For example, the vehicle proximity analysis system 102 may overlay telematics data, location data, and/or the like in the video file for review by the fleet manager. In some implementations, vehicle proximity analysis system 102 may generate a virtual reality file for display. For example, the vehicle proximity analysis system 102 may combine video data from a plurality of sources (e.g., a dashboard camera as well as other on-vehicle cameras (a backup camera, a mirror camera, etc.), publicly available video sources within a threshold proximity of the tailgating event, etc.) to generate a virtual reality file. In this case, the vehicle proximity analysis system 102 may push the virtual reality file to a virtual reality display type of client device 204 for review.

In this way, the vehicle proximity analysis system 102 enables auditing of results of classifying the driving event as a tailgating event. For example, the fleet manager may confirm that the vehicle proximity analysis system 102 is correct in classifying the driving event as a tailgating event (e.g., after viewing the video file) and may provide confirmation via client device 204.

As shown by reference number 276, the vehicle proximity analysis system 102 receives authentication of the headway score and the tailgate severity and trains the tailgate detection model. Based on receiving the authentication of the headway score, the vehicle proximity analysis system 102 may update the tailgate detection model based at least in part on the fleet manager confirming the classification of the driving event as a tailgating event. In this way, the vehicle proximity analysis system 102 enables supervised machine learning.

By utilizing the authentication to update the tailgate detection model, the vehicle proximity analysis system 102 may increase an amount of training data available to train the tailgate detection model. Increasing the amount of training data used to train the tailgate detection model may improve an accuracy of the tailgate detection model associated with detecting tailgating events based on headway scores. Further, by improving the accuracy of the tailgate detection model, the vehicle proximity analysis system 102 may conserve computing resources associated with inaccurately detecting tailgating events, performing an action associated with the tailgating event being inaccurately determined, and/or the like.

As indicated above, FIGS. 2A-2C are provided as an example. Other examples may differ from what is described with regard to FIGS. 2A-2C. The number and arrangement of devices shown in FIGS. 2A-2C are provided as an example. In practice, there may be additional devices, fewer devices, different devices, or differently arranged devices than those shown in FIGS. 2A-2C. Furthermore, two or more devices shown in FIGS. 2A-2C may be implemented within a single device, or a single device shown in FIGS. 2A-2C may be implemented as multiple, distributed devices. Additionally, or alternatively, a set of devices (e.g., one or more devices) shown in FIGS. 2A-2C may perform one or more functions described as being performed by another set of devices shown in FIGS. 2A-2C.

Figure 3:
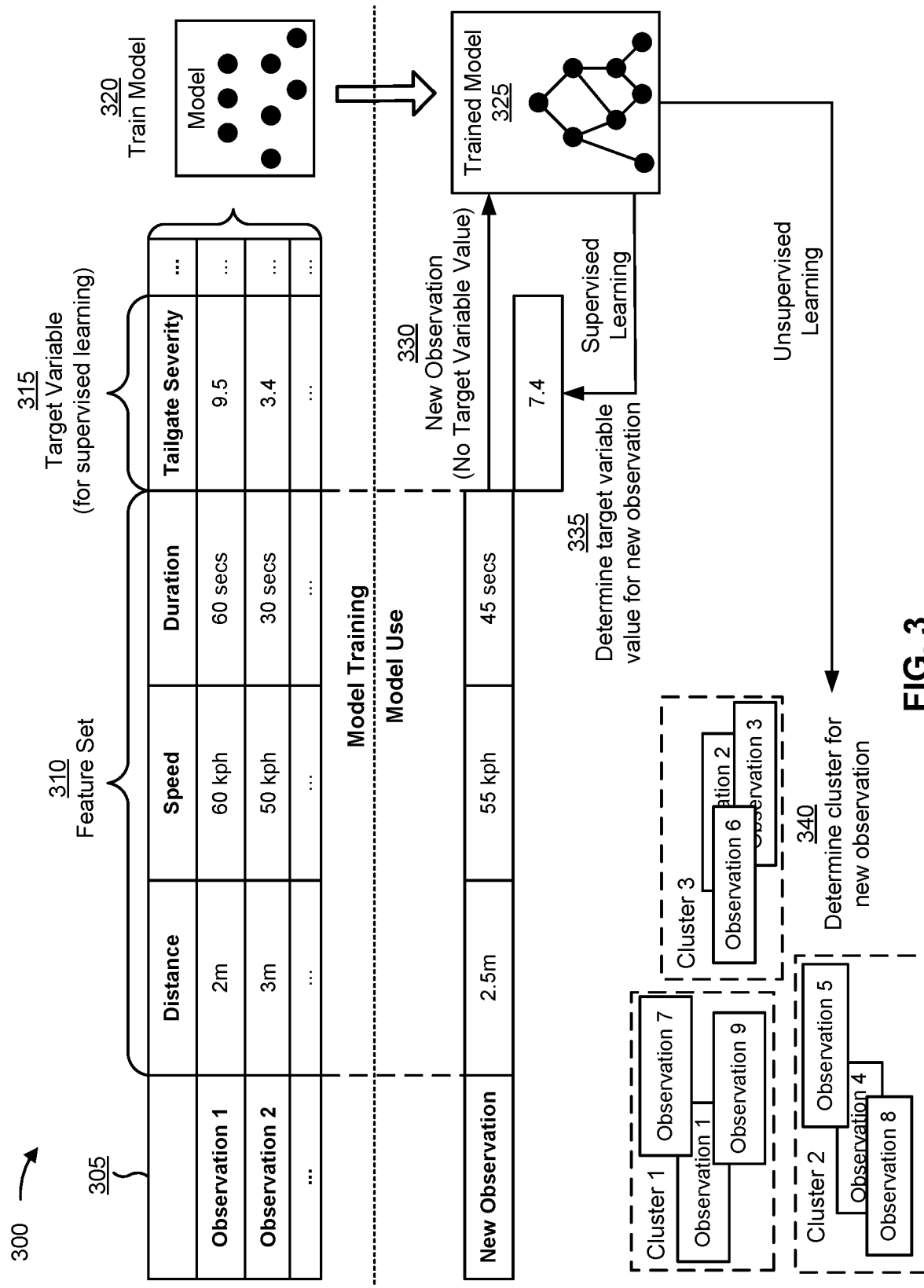
FIG. 3 is a diagram illustrating an example of training and using a machine learning model in connection with detecting tailgating by a vehicle.

FIG. 3 is a diagram illustrating an example 300 of training and using a machine learning model in connection with detecting tailgating by a vehicle. The machine learning model training and usage described herein may be performed using a machine learning system. The machine learning system may include or may be included in a computing device, a server, a cloud computing environment, and/or the like, such as the vehicle proximity analysis system 102 described in more detail elsewhere herein.

As shown by reference number 305, a machine learning model may be trained using a set of observations. The set of observations may be obtained from historical data, such as data gathered during one or more processes described herein. In some implementations, the machine learning system may receive the set of observations (e.g., as input) from vehicle proximity analysis system 102, as described elsewhere herein.

As shown by reference number 310, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the vehicle proximity analysis system 102 and/or the vehicle monitoring system 101. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of distance, a second feature of speed, a third feature of duration, and so on. As shown, for a first observation, the first feature may have a value of two meters, the second feature may have a value of sixty kilometers per hour, the third feature may have a value of sixty seconds, and so on. These features and feature values are provided as examples, and may differ in other examples.

As shown by reference number 315, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation. In example 300, the target variable is tailgate severity, which has a value of 9.5 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 320, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 325 to be used to analyze new observations.

As shown by reference number 330, the machine learning system may apply the trained machine learning model 325 to a new observation, such as by receiving a new observation and inputting the new observation to the trained machine learning model 325. As shown, the new observation may include a first feature of distance, a second feature of speed, a third feature of duration, and so on, as an example. The machine learning system may apply the trained machine learning model 325 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 325 may predict a value of 7.4 for the target variable of tailgate severity for the new observation, as shown by reference number 335. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 325 may classify (e.g., cluster) the new observation in a cluster, as shown by reference number 340. The observations within a cluster may have a threshold degree of similarity. As an example, if the machine learning system classifies the new observation in a first cluster (e.g., a severe tailgating event cluster), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a no tailgating event cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more threshold (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to detect tailgating by a vehicle. The machine learning system enables recognition and/or identification of tens, hundreds, thousands, or millions of features and/or feature values for tens, hundreds, thousands, or millions of observations, thereby increasing accuracy and consistency and reducing delay associated with detecting tailgating relative to requiring computing resources to be allocated for tens, hundreds, or thousands of operators to manually detect tailgating by a vehicle using the features or feature values.

As indicated above, FIG. 3 is provided as an example. Other examples may differ from what is described in connection with FIG. 3.

Figure 4:
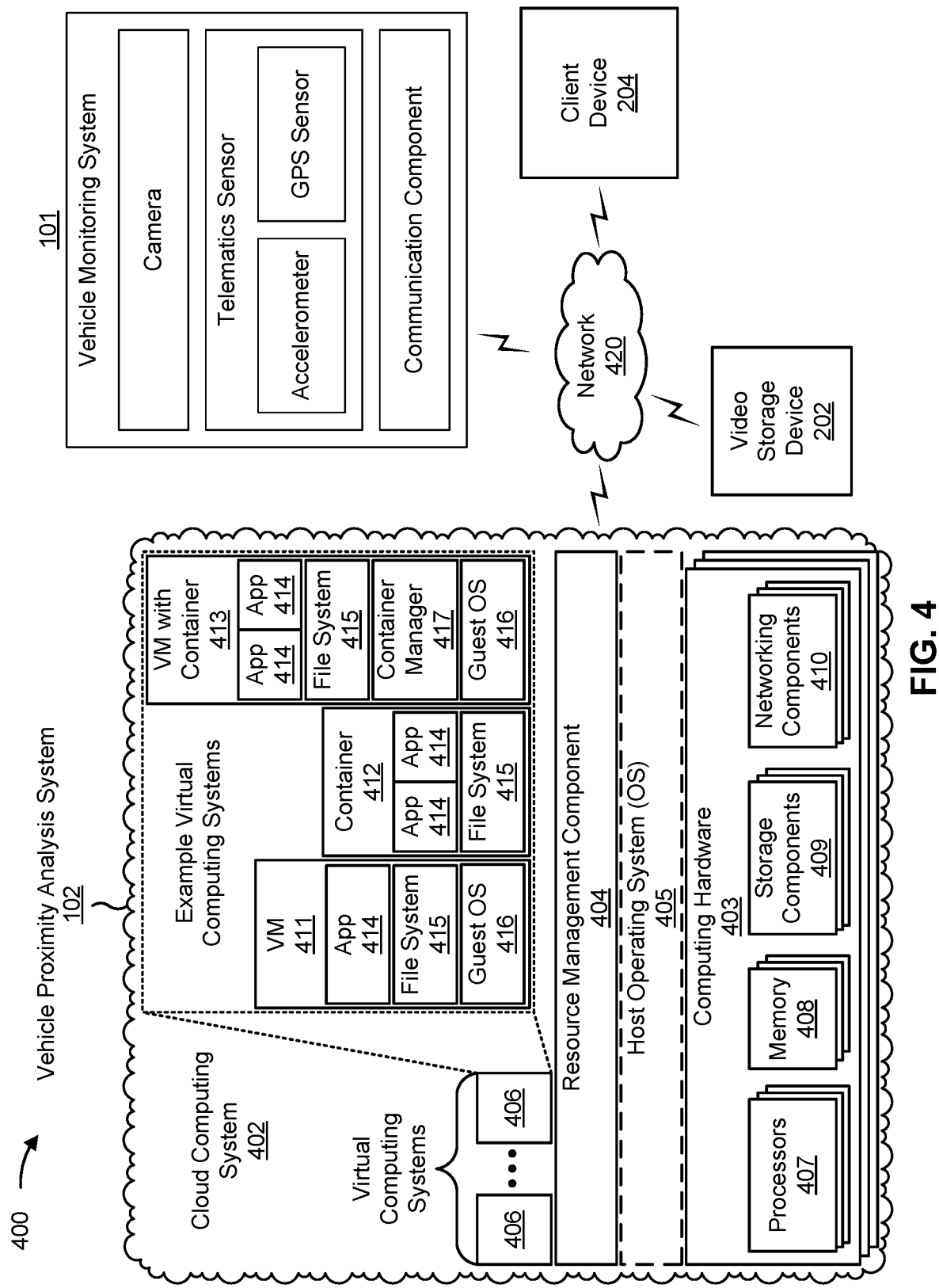
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a vehicle proximity analysis system 102. In some implementations, the vehicle proximity analysis system 102 may be located within a vehicle. In some implementations, the vehicle proximity analysis system 102 may be located within a device (e.g., vehicle monitoring system 101, client device 204, and/or the like). In some implementations, the vehicle proximity analysis system 102 may include one or more elements of and/or may execute within a cloud computing system 402. The cloud computing system 402 may include one or more elements 403-413, as described in more detail below. As further shown in FIG. 4, environment 400 may include a network 420, vehicle monitoring system 101, video storage device 202, and/or client device 204. Devices and/or elements of environment 400 may interconnect via wired connections and/or wireless connections.

The cloud computing system 402 includes computing hardware 403, a resource management component 404, a host operating system (OS) 405, and/or one or more virtual computing systems 406. The resource management component 404 may perform virtualization (e.g., abstraction) of computing hardware 403 to create the one or more virtual computing systems 406. Using virtualization, the resource management component 404 enables a single computing device (e.g., a computer, a server, and/or the like) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, one or more storage components 409, and/or one or more networking components 410. Examples of a processor, a memory, a storage component, and a networking component (e.g., a communication component) are described elsewhere herein.

The resource management component 404 includes a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, and/or the like) or a virtual machine monitor, such as when the virtual computing systems 406 are virtual machines 411. Additionally, or alternatively, the resource management component 404 may include a container manager, such as when the virtual computing systems 406 are containers 412. In some implementations, the resource management component 404 executes within and/or in coordination with a host operating system 405.

A virtual computing system 406 includes a virtual environment that enables cloud-based execution of operations and/or processes described herein using computing hardware 403. As shown, a virtual computing system 406 may include a virtual machine 411, a container 412, a hybrid environment 413 that includes a virtual machine and a container, and/or the like. A virtual computing system 406 may execute one or more applications using a file system that includes binary files, software libraries, and/or other resources required to execute applications on a guest operating system (e.g., within the virtual computing system 406) or the host operating system 405.

Although the vehicle proximity analysis system 102 may include one or more elements 403-413 of the cloud computing system 402, may execute within the cloud computing system 402, and/or may be hosted within the cloud computing system 402, in some implementations, the vehicle proximity analysis system 102 may not be cloud-based (e.g., may be implemented outside of a cloud computing system) or may be partially cloud-based. For example, the vehicle proximity analysis system 102 may include one or more devices that are not part of the cloud computing system 402, such as device 500 of FIG. 5, which may include a standalone server or another type of computing device. The vehicle proximity analysis system 102 may perform one or more operations and/or processes described in more detail elsewhere herein.

Network 420 includes one or more wired and/or wireless networks. For example, network 420 may include a cellular network, a public land mobile network (PLMN), a local area network (LAN), a wide area network (WAN), a private network, the Internet, and/or the like, and/or a combination of these or other types of networks. The network 420 enables communication among the devices of environment 400.

Vehicle monitoring system 101 includes one or more devices capable of receiving, generating, storing, processing, and/or providing information associated with detecting tailgating events. For example, vehicle monitoring system 101 may include a camera, a telemetry device such as a telematics sensor, and/or a communication component (e.g., a mobile phone device, a wireless communication device, and/or the like). In some implementations, the camera may include a dashboard camera, a video camera, and/or the like, and may capture and collect video data concerning the vehicle, the trajectory of the vehicle, a road that the vehicle is traveling on, one or more objects on and/or near the road, and/or the like. In some implementations, the telematics sensor may include an accelerometer that collects data concerning acceleration/deceleration of the vehicle, and/or can include a global positioning system (GPS) sensor that collects data concerning a position of the vehicle. In some implementations, the communication component may facilitate communication between vehicle monitoring system 101 and the one or more other devices, such as video storage device 202, client device 204, and/or vehicle proximity analysis system 102, via network 420.

Video storage device 202 includes one or more devices capable of receiving, generating, storing, processing, and/or providing video data associated with detecting tailgating events. For example, video storage device 202 may include a computing device, a server device, a data center device, or other device capable of receiving video data from vehicle monitoring system 101, storing the video data, and/or hosting the video data for download by vehicle proximity analysis system 102 and/or client device 204.

Client device 204 includes one or more devices capable of receiving, generating, storing, processing, and/or providing information associated with detecting tailgating events. For example, client device 204 may include a communication and/or computing device, such as a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, and/or the like), or a similar type of device. In some implementations, client device 204 may display information concerning a tailgating event, a headway score associated with the tailgating event, video data concerning the tailgating event, data concerning acceleration/deceleration of a vehicle, and/or data concerning a position of the vehicle.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
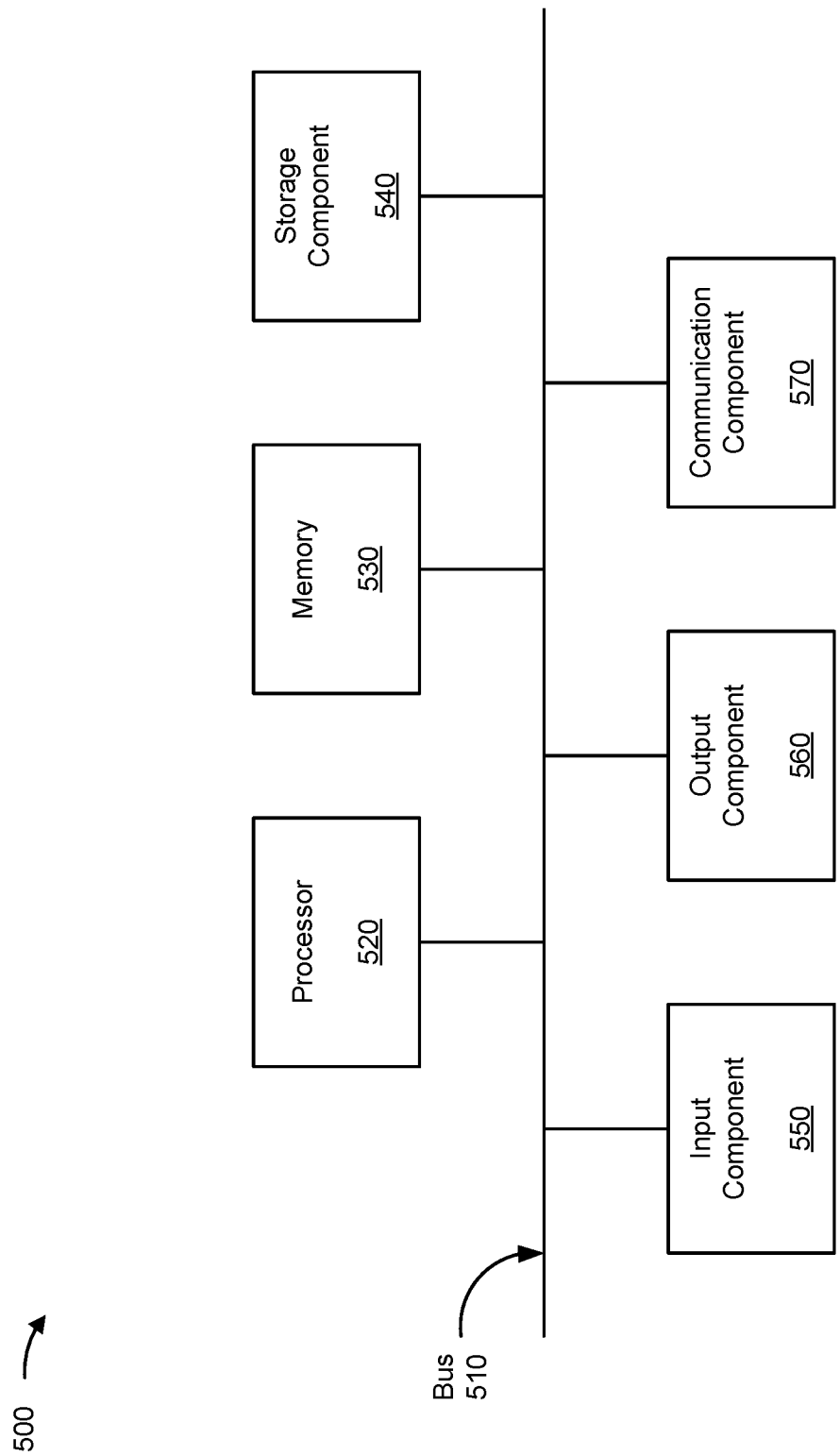
FIG. 5 is a diagram of example components of one or more devices of FIG. 4.

FIG. 5 is a diagram of example components of a device 500, which may correspond to vehicle proximity analysis system 102, vehicle monitoring system 101, video storage device 202, and/or client device 204. In some implementations, vehicle proximity analysis system 102, vehicle monitoring system 101, video storage device 202, and/or client device 204 may include one or more devices 500 and/or one or more components of device 500. As shown in FIG. 5, device 500 may include a bus 510, a processor 520, a memory 530, a storage component 540, an input component 550, an output component 560, and a communication component 570.

Bus 510 includes a component that enables wired and/or wireless communication among the components of device 500. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform a function. Memory 530 includes a random access memory, a read only memory, and/or another type of memory (e.g., a flash memory, a magnetic memory, and/or an optical memory).

Storage component 540 stores information and/or software related to the operation of device 500. For example, storage component 540 may include a hard disk drive, a magnetic disk drive, an optical disk drive, a solid state disk drive, a compact disc, a digital versatile disc, and/or another type of non-transitory computer-readable medium. Input component 550 enables device 500 to receive input, such as user input and/or sensed inputs. For example, input component 550 may include a touch screen, a keyboard, a keypad, a mouse, a button, a microphone, a switch, a sensor, a global positioning system component, an accelerometer, a gyroscope, an actuator, and/or the like. Output component 560 enables device 500 to provide output, such as via a display, a speaker, and/or one or more light-emitting diodes. Communication component 570 enables device 500 to communicate with other devices, such as via a wired connection and/or a wireless connection. For example, communication component 570 may include a receiver, a transmitter, a transceiver, a modem, a network interface card, an antenna, and/or the like.

Device 500 may perform one or more processes described herein. For example, a non-transitory computer-readable medium (e.g., memory 530 and/or storage component 540) may store a set of instructions (e.g., one or more instructions, code, software code, program code, and/or the like) for execution by processor 520. Processor 520 may execute the set of instructions to perform one or more processes described herein. In some implementations, execution of the set of instructions, by one or more processors 520, causes the one or more processors 520 and/or the device 500 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
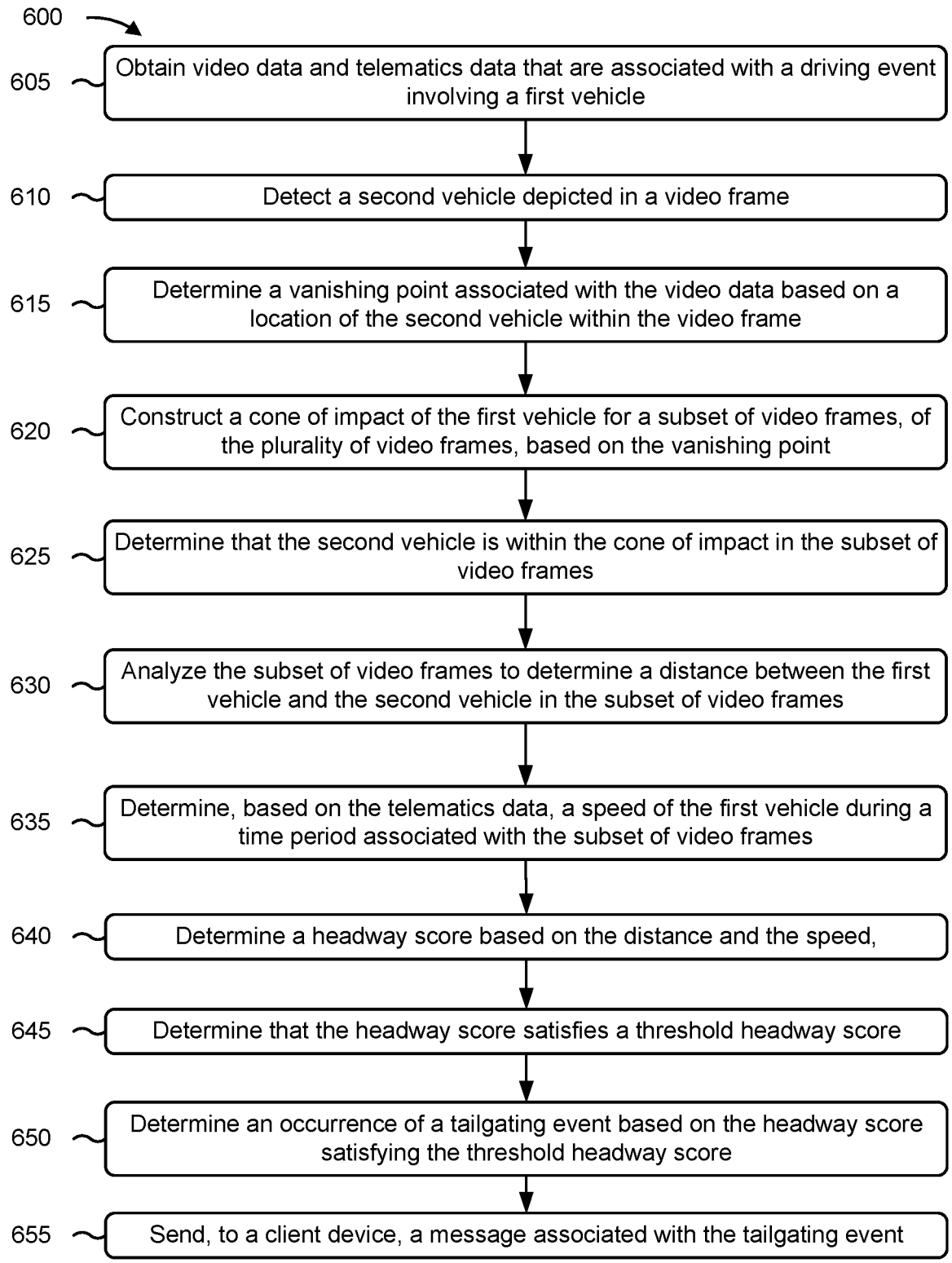
FIG. 6 is a flow chart of an example process relating to detecting tailgating by a vehicle.

FIG. 6 is a flowchart of an example process 600 associated with detecting tailgating by a vehicle. In some implementations, one or more process blocks of FIG. 6 may be performed by a device (e.g., vehicle proximity analysis system 102). In some implementations, one or more process blocks of FIG. 6 may be performed by another device or a group of devices separate from or including the device, such as a vehicle monitoring system (e.g., vehicle monitoring system 101), a video storage device (e.g., video storage device 202), and/or a client device (e.g., client device 204). Additionally, or alternatively, one or more process blocks of FIG. 6 may be performed by one or more components of device 500, such as processor 520, memory 530, storage component 540, input component 550, output component 560, and/or communication component 570.

As shown in FIG. 6, process 600 may include obtaining video data and telematics data that are associated with a driving event involving a first vehicle (block 605). For example, the device may obtain video data and telematics data that are associated with a driving event involving a first vehicle, as described above. In some implementations, the video data includes a plurality of video frames captured by a camera associated with the first vehicle. In some implementations, the camera is mounted to the first vehicle and configured to have a field of view that corresponds to a direction of travel of the first vehicle.

In some implementations, at least one of the telematics data, the video data, a user input to a user interface associated with the device, or sensor data from another device indicates a harsh driving event that triggers acquisition of the video data and the telematics data, and wherein the driving event is associated with the harsh driving event.

As further shown in FIG. 6, process 600 may include detecting a second vehicle depicted in a video frame (block 610). For example, the device may detect a second vehicle depicted in a video frame of the plurality of video frames, as described above.

As further shown in FIG. 6, process 600 may include determining a vanishing point associated with the video data based on a location of the second vehicle within the video frame (block 615). For example, the device may determine a vanishing point associated with the video data based on a location of the second vehicle within the video frame, as described above.

In some implementations, determining the vanishing point comprises determining a bounding box within the video frame that includes the second vehicle; determining a trajectory of the second vehicle based on the bounding box; and determining the vanishing point based on the trajectory of the second vehicle. The trajectory of the second vehicle may be determined by determining a plurality of corners of the bounding box; determining a plurality of trajectories based on the plurality of corners of the bounding box; determining an intersection point associated with the plurality of trajectories; and determining the vanishing point based on the intersection point.

Alternatively, and/or additionally, determining the vanishing point may comprise detecting a plurality of vehicles depicted in the subset of video frames; determining a first bounding box that includes the second vehicle and a second bounding box that includes a third vehicle, of the plurality of vehicles; determining a first candidate vanishing point based on the first bounding box; determining a second candidate vanishing point based on the second bounding box; and determining the vanishing point based on the first candidate vanishing point and the second candidate vanishing point.

In some implementations, the device determines the first candidate vanishing point and a first confidence score based on the trajectory of the second vehicle. The device may determine a trajectory of the third vehicle based on the second bounding box. The device may determine the second candidate vanishing point and a second confidence score based on the trajectory of the third vehicle. The device may determine a first weighted vanishing point based on the first candidate vanishing point and the first confidence score. The device may determine a second weighted vanishing point based on the second candidate vanishing point and the second confidence score. The device may determine the vanishing point based on the first weighted vanishing point and the second weighted vanishing point.

As further shown in FIG. 6, process 600 may include constructing a cone of impact of the first vehicle for a subset of video frames, of the plurality of video frames, based on the vanishing point (block 620). For example, the device may construct a cone of impact of the first vehicle for a subset of video frames, of the plurality of video frames, based on the vanishing point, as described above.

In some implementations, constructing the cone of impact of the first vehicle for the subset of video frames comprises computing an optical flow of the subset of video frames, determining vanishing points of the subset of video frames, and constructing the cone of impact of the first vehicle for the subset of video frames based on the optical flow and the vanishing points.

As further shown in FIG. 6, process 600 may include determining that the second vehicle is within the cone of impact in the subset of video frames (block 625). For example, the device may determine that the second vehicle is within the cone of impact in the subset of video frames, as described above. In some implementations, the device may utilize a vehicle detection model to detect the second vehicle. The vehicle detection model may be configured to detect the second vehicle based on a vehicle type of the second vehicle.

In some implementations, determining that the second vehicle is within the cone of impact comprises determining a bounding box, that includes the second vehicle, within the video frame; identifying a lowest edge of the bounding box relative to other edges of the bounding box; determining a center point of the lowest edge of the bounding box; determining that the center point is within the cone of impact; and determining that the second vehicle is within the cone of impact based on the center point being within the cone of impact.

As further shown in FIG. 6, process 600 may include analyzing the subset of video frames to determine a distance between the first vehicle and the second vehicle in the subset of video frames (block 630). For example, the device may analyze the subset of video frames to determine a distance between the first vehicle and the second vehicle in the subset of video frames, as described above.

In some implementations, analyzing the subset of video frames to determine the distance comprises determining, based on a shape of the second vehicle as depicted in the subset of video frames, a type of the second vehicle, determining a size of the second vehicle as depicted in the subset of video frames, and determining the distance based on the type of the second vehicle and the size of the second vehicle.

In some implementations, the device uses a depth analysis model to determine the distance between the first vehicle and the second vehicle based on the subset of video frames. The depth analysis model may be trained based on historical video data that depicts other vehicles and corresponding distance information associated with the other vehicles. The other vehicles may be a same vehicle type as a vehicle type of the second vehicle.

As further shown in FIG. 6, process 600 may include determining, based on the telematics data, a speed of the first vehicle during a time period associated with the subset of video frames (block 635). For example, the device may determine, based on the telematics data, a speed of the first vehicle during a time period associated with the subset of video frames, as described above.

As further shown in FIG. 6, process 600 may include determining a headway score based on the distance and the speed (block 640). For example, the device may determine a headway score based on the distance and the speed, as described above. In some implementations, the headway score is representative of a severity associated with the first vehicle being within a proximity threshold of the second vehicle during the time period.

As further shown in FIG. 6, process 600 may include determining that the headway score satisfies a threshold headway score (block 645). For example, the device may determine that the headway score satisfies a threshold headway score, as described above.

As further shown in FIG. 6, process 600 may include determining an occurrence of a tailgating event based on the headway score satisfying the threshold headway score (block 650). For example, the device may determine an occurrence of a tailgating event based on the headway score satisfying the threshold headway score, as described above.

The device may classify, based on the headway score satisfying the threshold headway score, the driving event as including a tailgating event, wherein a message sent to a client device indicates that the driving event includes the tailgating event. Alternatively, and/or additionally, the device may store the headway score based on determining that the headway score satisfies the threshold headway score. The device may store the headway score in a data structure in association with the video data based on the headway score satisfying the threshold headway score. The data structure may include a plurality of headway scores that are associated with a plurality of vehicles of a fleet.

As further shown in FIG. 6, process 600 may include sending, to a client device, a message associated with the tailgating event (block 655). For example, the device may send, to a client device, a message associated with the tailgating event, as described above. In some implementations, the client device is one of a plurality of client devices, the method further comprising prior to sending the message, identifying, based on an identifier associated with the video data or the telematics data, a vehicle identifier of the first vehicle, and selecting, based on the vehicle identifier being mapped to the client device, the client device from the plurality of client devices, wherein the message is sent to the client device based on selecting the client device. In some implementations, the vehicle is one of a plurality of vehicles of a fleet and the client device is associated with managing the fleet.

In some implementations, the device may send, to the client device, a request for an authentication of the headway score indicating that the tailgating event. The device may receive, from the client device, a response associated with the authentication.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   determining, by a device, that a first vehicle is within a cone of impact in a video frame based on determining whether a center point of a lowest edge of a bounding box associated with the first vehicle is within the cone of impact,
      wherein the cone of impact is determined from a perspective of a camera that captures the video frame and is represented as a triangular area of the video frame,
      wherein a vertex of the triangular area includes a vanishing point associated with the video frame,
      wherein a side of the triangular area coincides with a portion of a bottom boundary of the video frame, and
      wherein the portion of the bottom boundary of the video frame is selected based on a horizontal inclination of the video frame and a height at which the camera is mounted;
   determining, by the device, a distance between the first vehicle and a second vehicle based on the cone of impact;
   determining, by the device, a score based on the distance between the first vehicle and the second vehicle and a speed of the second vehicle; and
   providing, by the device and to a client device, a notification based on the score.

2. The method of claim 1, wherein the score represents a severity of tailgating event associated with the first vehicle and the second vehicle.

3. The method of claim 1, further comprising:
   utilizing a machine learning model to detect the first vehicle within the cone of impact in the video frame.

4. The method of claim 1, further comprising:
   receiving authentication of the score, and
   training a tailgate detection model based on the score.

5. The method of claim 1, further comprising:
   utilizing an object detection algorithm to identify the first vehicle within the video frame.

6. The method of claim 1, wherein the vanishing point is determined based on selecting a candidate point, from a set of candidate points, based on confidence scores associated with each candidate point of the set of candidate points.

7. The method of claim 1, wherein a length of the portion of the bottom boundary is determined based on one or more of:
   the height at which the camera is mounted, and
   a size of the first vehicle in the video frame.

8. A non-transitory computer-readable medium storing a set of instructions, the set of instructions comprising:
   one or more instructions that, when executed by one or more processors of a device, cause the device to:
      determine that a first vehicle is within a cone of impact in a video frame based on determining whether a center point of an edge of a bounding box associated with the first vehicle is within the cone of impact,
         wherein the cone of impact is determined from a perspective of a camera that captures the video frame and is represented as a triangular area of the video frame,
         wherein a vertex of the triangular area includes a vanishing point associated with the video frame,
         wherein a side of the triangular area coincides with a portion of a bottom boundary of the video frame, and
         wherein the portion of the bottom boundary of the video frame is selected based on a horizontal inclination of the video frame and a height at which the camera is mounted;
      determine a distance between the first vehicle and a second vehicle based on the cone of impact;
      determine a score based on the distance between the first vehicle and the second vehicle and a speed of the second vehicle; and
      provide, to a client device, a notification based on the score.

9. The non-transitory computer-readable medium of claim 8, wherein the score represents a severity of tailgating event associated with the first vehicle and the second vehicle.

10. The non-transitory computer-readable medium of claim 8, wherein the one or more instructions further cause the device to:
    utilize a machine learning model to detect the first vehicle within the cone of impact in the video frame.

11. The non-transitory computer-readable medium of claim 8, wherein the one or more instructions further cause the device to:
    receive authentication of the score, and
    train a tailgate detection model based on the score.

12. The non-transitory computer-readable medium of claim 8, wherein the one or more instructions further cause the device to:
    utilize an object detection algorithm to identify the first vehicle within the video frame.

13. The non-transitory computer-readable medium of claim 8, wherein the vanishing point is determined based on selecting a candidate point, from a set of candidate points, based on confidence scores associated with each candidate point of the set of candidate points.

14. The non-transitory computer-readable medium of claim 8, wherein a length, of the side of the triangular area that coincides with the portion of the bottom boundary of the video frame, is determined based on:
   the height at which the camera is mounted, and
   a size of the first vehicle in the video frame.

15. A device, comprising:
   one or more processors configured to:
      determine that a first vehicle is within a cone of impact in a video frame based on determining whether a center point associated with an edge of a bounding box associated with the first vehicle is within the cone of impact,
         wherein the cone of impact is determined from a perspective of a camera that captures the video frame and is represented as a triangular area of the video frame,
         wherein a vertex of the triangular area includes a vanishing point associated with the video frame,
         wherein a side of the triangular area coincides with a portion of a bottom boundary of the video frame, and
         wherein the portion of the bottom boundary of the video frame is selected based on a horizontal inclination of the video frame and a height at which the camera is mounted on a second vehicle;
      determine a score based on a distance between the first vehicle and the second vehicle and a speed of the second vehicle; and
      provide, to a client device, a notification based on the score.

16. The device of claim 15, wherein the score represents a severity of tailgating event associated with the first vehicle and the second vehicle.

17. The device of claim 15, wherein the one or more processors are further configured to:
   utilize a machine learning model to detect the first vehicle within the cone of impact in the video frame.

18. The device of claim 15, wherein the one or more processors are further configured to:
   receive authentication of the score, and
   train a tailgate detection model based on the score.

19. The device of claim 15, wherein the one or more processors are further configured to:
   utilize an object detection algorithm to identify the first vehicle within the video frame.

20. The device of claim 15, wherein the vanishing point is determined based on selecting a candidate point, from a set of candidate points, based on confidence scores associated with each candidate point of the set of candidate points.

* * * * *